(12) United States Patent
Narasimha et al.

(10) Patent No.: US 9,273,972 B2
(45) Date of Patent: Mar. 1, 2016

(54) NAVIGATION SYSTEM WITH ERROR DETECTION MECHANISM AND METHOD OF OPERATION THEREOF

(71) Applicant: Telenav, Inc., Sunnyvale, CA (US)

(72) Inventors: Pramod Lakshmi Narasimha, Sunnyvale, CA (US); Aliasgar Mumtaz Husain, Milpitas, CA (US)

(73) Assignee: TELENAV, INC., Sunnyvale, CA (US)

( * ) Notice: Subject to any disclaimer, the term of this patent is extended or adjusted under 35 U.S.C. 154(b) by 99 days.

(21) Appl. No.: 14/211,239

(22) Filed: Mar. 14, 2014

(65) Prior Publication Data

US 2015/0260533 A1 Sep. 17, 2015

(51) Int. Cl.
*G01C 21/34* (2006.01)

(52) U.S. Cl.
CPC .................................... *G01C 21/34* (2013.01)

(58) Field of Classification Search
CPC ................ G01C 21/26; G01C 21/3682; G06F 17/30241; G06F 17/30985; G06F 17/3087

USPC ............ 701/400, 532; 707/E17.018, E17.109
See application file for complete search history.

(56) References Cited

U.S. PATENT DOCUMENTS

| 2009/0070028 | A1 | 3/2009 | Hempel |
| 2009/0171558 | A1 | 7/2009 | Davis et al. |
| 2009/0265340 | A1* | 10/2009 | Barcklay et al. ................ 707/5 |
| 2010/0153348 | A1 | 6/2010 | Perczynski et al. |
| 2014/0222723 | A1 | 8/2014 | Narasimha |

* cited by examiner

*Primary Examiner* — Marthe Marc-Coleman
(74) *Attorney, Agent, or Firm* — IP Investment Law Group

(57) ABSTRACT

A method of operation of a navigation system includes: accessing points of interest; identifying a target of interest including a field selection based on accessing the points of interest; generating a categorical set and a further set from the points of interest based on the field selection of the target of interest; calculating an error-related probability based on the categorical set and the further set; and determining an erroneous entry associated with the target of interest based on the error-related probability for displaying on a device.

20 Claims, 5 Drawing Sheets

NAVIGATION SYSTEM WITH ERROR DETECTION MECHANISM AND METHOD OF OPERATION THEREOF

TECHNICAL FIELD

An embodiment of the present invention relates generally to a navigation system, and more particularly to a system with an error detection mechanism.

BACKGROUND ART

Modern consumer and industrial electronics, especially devices such as graphical navigation systems, televisions, projectors, cellular phones, portable digital assistants, and combination devices, are providing increasing levels of functionality to support modern life including location-based information services. Research and development in the existing technologies can take a myriad of different directions.

As users become more empowered with the growth of mobile communication technology, new and old paradigms begin to take advantage of this new space. One such space is regarding use of locations of interest. The possible applications for processing errors regarding locations of interest have not yet been fully utilized.

Thus, a need still remains for a navigation system with error detection mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a navigation system including: accessing points of interest; identifying a target of interest including a field selection based on accessing the points of interest; generating a categorical set and a further set from the points of interest based on the field selection of the target of interest; calculating an error-related probability based on the categorical set and the further set; and determining an erroneous entry associated with the target of interest based on the error-related probability for displaying on a device.

An embodiment of the present invention provides a navigation system, including: a storage interface for accessing points of interest; a control unit, coupled to the storage interface, for: identifying a target of interest including a field selection based on accessing the points of interest, generating a categorical set and a further set from the points of interest based on the field selection of the target of interest, calculating an error-related probability based on the categorical set and the further set, and determining an erroneous entry associated with the target of interest based on the error-related probability for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
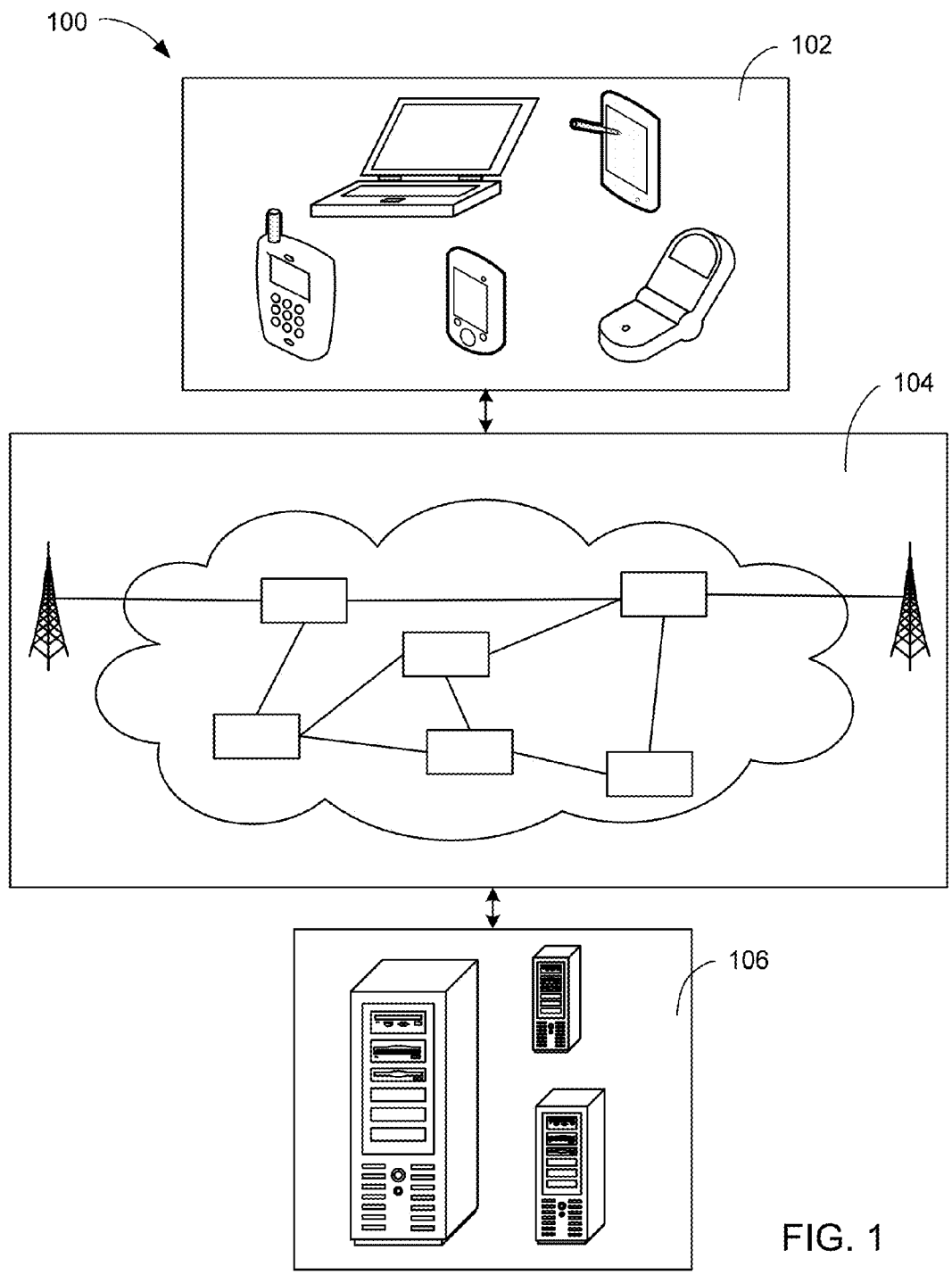
FIG. 1 is a navigation system with error detection mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y); where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein can include the navigation information described as well as information relating to points of interest to the user, such as local business, hours of businesses, types of businesses, advertised specials, traffic information, maps, local events, and location based community or personal information.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

Referring now to FIG. 1, therein is shown a navigation system 100 with error detection mechanism in an embodiment of the present invention. The navigation system 100 includes a first device 102, such as a client or a server, connected to a second device 106, such as a client or server. The first device 102 can communicate with the second device 106 with a network 104, such as a wireless or wired network.

For example, the first device 102 can be of any of a variety of display devices, such as a cellular phone, personal digital assistant, a notebook computer, automotive telematics navigation system, or other multi-functional mobile communication or entertainment device. The first device 102 can couple, either directly or indirectly, to the network 104 to communicate with the second device 106 or can be a stand-alone device. The first device 102 further be separate form or incorporated with a vehicle, such as a car, truck, bus, or train.

For illustrative purposes, the navigation system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices, or video transmission devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, such as a car, a truck, a bus, or a train.

Also for illustrative purposes, the navigation system 100 is described with the second device 106 as a computing device, although it is understood that the second device 106 can be different types of devices. Also for illustrative purposes, the navigation system 100 is shown with the second device 106 and the first device 102 as end points of the network 104, although it is understood that the navigation system 100 can have a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

Figure 2:
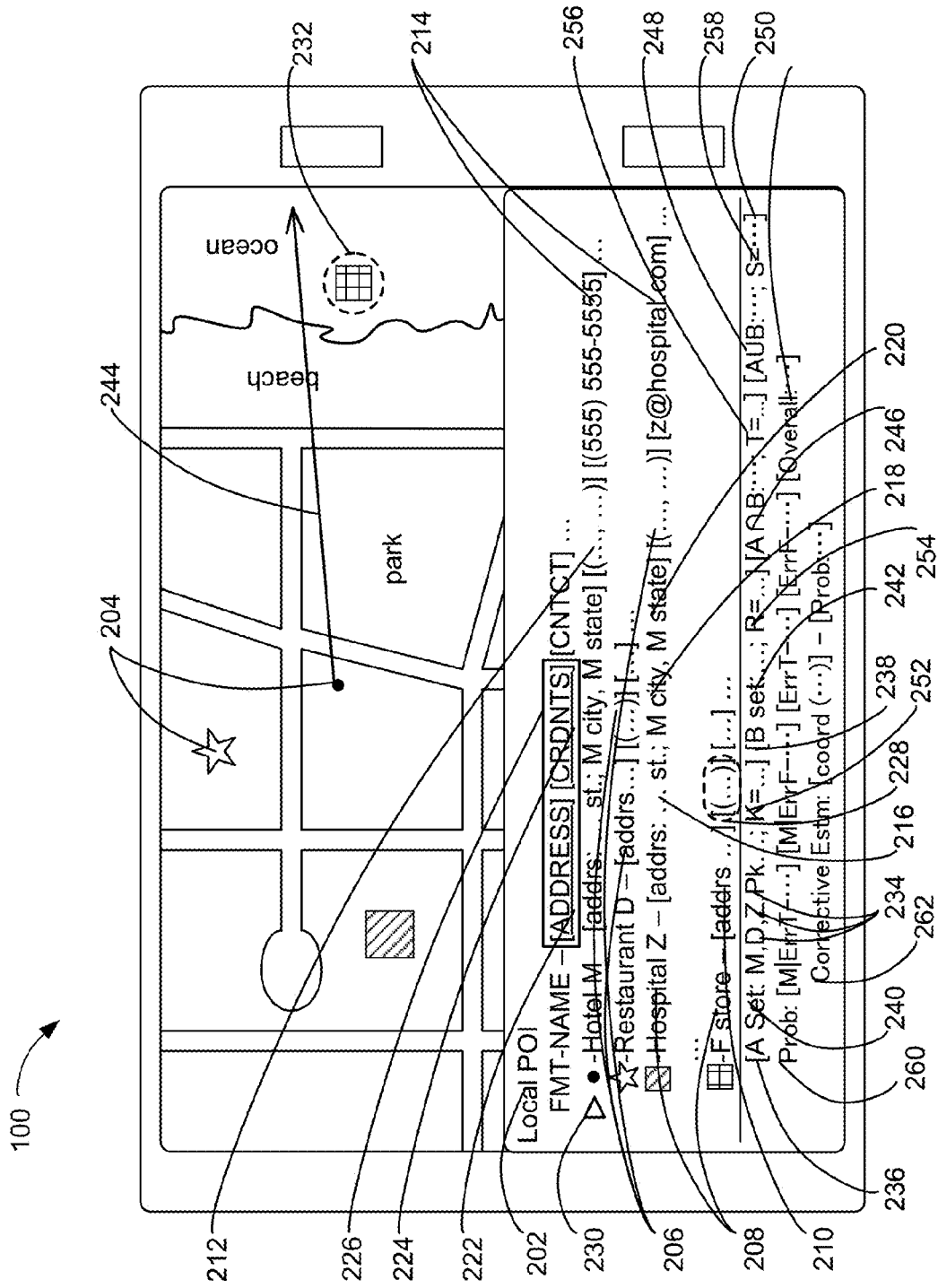
FIG. 2 is an example of a display interface of the first device.

Referring now to FIG. 2, therein is shown an example of a display interface of the first device 102 of FIG. 1. The display interface can show an interest point set 202. The interest point set 202 is a collection of locations having a meaning or a significance to a user (not shown) or the navigation system 100. The interest point set 202 can include points of interest 204.

The points of interest 204 are each locations having the meaning or the significance to the user or the navigation system 100. The points of interest 204 can each be locations that may be useful or interesting to one or more users of the navigation system 100. The points of interest 204 can include stores, restaurants, tourist locations, entertainment venues, personalized locations, such as home or favorite restaurant, locations associated to events or advertisement, or a combination thereof. The points of interest 204 can be determined or identified by the user, the navigation system 100, or a combination thereof.

Each of the points of interest 204 can include a field type 206. The field type 206 is a categorization for information associated with the location corresponding to one or more instances of the points of interest 204. For example, the field type 206 can include a brand name 208, an address 210, location coordinates 212, a contact information 214, other information, or a combination thereof.

The brand name 208 is a letter, a number, a symbol, or a combination thereof representing a location, an entity, a person, an object, or a combination thereof. The brand name 208 can represent an identifier for each instance of the points of interest 204. For example, the brand name 208 can include an identifier, such as a name, a pseudonym, a trademark, or a combination thereof, an image, a symbol, or a combination thereof identifying the points of interest 204.

The address 210 is a set of information describing a location of a structure or a unit of a geographic area in a society according to a societal system. For example, the address 210 can include a set of information describing the location of a building, a house, a plot of land, an apartment unit, or a combination thereof within a zone, a country, a state, a county, a city, or a combination thereof according to a postal system or a mailing system.

The address 210 can include a street label 216, a city label 218, a state label 220, an alias, or a combination thereof. The street label 216 can include a name or a number corresponding to an access way associated with the points of interest 204, a relative location on the access way, or a combination thereof. For example, the street label 216 can include a street number or name adjacent to the points of interest 204, a geographical unit identification, such as a house number or a building address number, corresponding to the points of interest 204, or a combination thereof.

The city label 218 can include a city name, a district, a zone identifier, a town name, or a combination thereof. The state label 220 can include a name of an area encompassing the area corresponding to the city label 218, including an identifier for a state, a municipality, a region, a territory, a province, prefecture, or a combination thereof.

The location coordinates 212 can include navigation information, such as a number, a letter, a symbol, a sequence thereof, or a combination thereof representing a geographic location according to a system including a consistent division of space. For example, the location coordinates 212 can include latitude-longitude pair, a global positioning system (GPS) coordinate set, a set of coordinates according to a local system, or a combination thereof.

The contact information 214 can include a number, a letter, a symbol, a sequence thereof, or a combination thereof for communicating information with a person or an entity at the points of interest 204. For example, the contact information 214 can include a phone number, a website address, an email address, or a combination thereof.

The points of interest 204 can further include other instances of the field type 206, such as description, a keyword, a rating, or a combination thereof. For example, the field type 206 can include one or more key words provided by the user, the points of interest 204, the navigation system 100, or a combination thereof. Also for example, the field type 206 can include a description, a blog entry, a score or an evaluation, or a combination thereof provided by the user, other users or patrons, the navigation system 100, the points of interest 204, or a combination thereof.

The navigation system 100 can use a field selection 222 and a further selection 224 of the field type 206 having a correlative categorical relationship 226 to determine an erroneous entry 228 associated with a target of interest 230. The field selection 222 and the further selection 224 are each unique instances of the field type 206. For example, the field selection 222 can be for the address 210 and the further selection 224 can be for the location coordinates 212 or the contact information 214. Also for example, the field selection 222 can be for the brand name 208 or the location coordinates 212 and the further selection 224 can be for the contact information 214.

The correlative categorical relationship 226 is a connection or an association between instances of the field type 206. The navigation system 100 can determine the correlative categorical relationship 226 using machine-learning mechanism, pattern-detection mechanism, other method or process, or a combination thereof. The correlative categorical relationship 226 can also be predetermined. Details regarding the correlative categorical relationship 226 will be discussed below.

The erroneous entry 228 is incorrect data associated with one or more instance of the points of interest 204. The erroneous entry 228 can be an error in the value within one or more instance of the field type 206 for one or more instance of the points of interest 204.

For example, the erroneous entry 228 can include a geocoding error 232. The geocoding error 232 is a type of error describing an inconsistency between the address 210 and the location coordinates 212 for one instance of the points of interest 204.

The target of interest 230 is one instance of the points of interest 204 selected by the navigation system 100 for processing. The target of interest 230 can be the instance of the points of interest 204 analyzed for the erroneous entry 228. The navigation system 100 can process data for the field type 206 therein to determine an existence of the erroneous entry 228.

The navigation system 100 can identify a target neighbor 234 corresponding to the target of interest 230. The target neighbor 234 is an instance of the points of interest 204 different from the target of interest 230 but related thereto. The target neighbor 234 can be related to the target of interest 230 physically, abstractly, logically, or a combination thereof.

For example, the target neighbor 234 can have a similar value or a same component as the target neighbor 234, such as the brand name 208 or the city label 218. Also for example, the target neighbor 234 can satisfy an abstract or a logical condition with respect to the target of interest 230, such as within a specific distance or consistency in the keywords or the description.

The navigation system 100 can generate a categorical set 236, a further set 238, or a combination thereof. The categorical set 236 is a grouping of the points of interest 204 based on one instance of the field type 206. The categorical set 236 can be based on or correspond to the field selection 222. The categorical set 236 can be the collection of the points of interest 204 having a specific value, having similar values, having values within a threshold range or condition, or a combination thereof for the field selection 222.

The further set 238 is a grouping of the points of interest 204 based on an instance of the field type 206 different from that of the categorical set 236. The further set 238 can be based on the instance of the field type 206 having the correlative categorical relationship 226 to the field type 206 of the categorical set 236. The further set 238 can be based on or correspond to the further selection 224. The further set 238 can be the collection of the points of interest 204 having a specific value, having similar values, having values within a threshold range or condition, or a combination thereof for the further selection 224.

For example, the categorical set 236 can include an address set 240 based on the field selection 222 of the address 210. The categorical set 236 can include instances of the points of interest 204 having same or similar values in the street label 216, the city label 218, the state label 220, or a combination thereof.

Also for example, the further set 238 can include an area set 242 based on the further selection 224 of the location coordinates 212. The area set 242 can be based on an area size 244 as a distance or a condition based on a specific geographic location described by the location coordinates 212. As a more specific example, the area set 242 can include the points of interest 204 within a distance described by the area size 244 from the target of interest 230.

The navigation system 100 can further generate an intersection set 246, a union set 248, or a combination thereof. The navigation system 100 can further generate the intersection set 246, the union set 248, or a combination thereof based on the categorical set 236, the further set 238, or a combination thereof.

The intersection set 246 is a collection of the points of interest 204 occurring in two or more separate groupings of the points of interest 204. For example, the intersection set 246 can include the points of interest 204 occurring in both the categorical set 236 and the further set 238. The union set 248 between a grouping 'A' and a separate grouping 'L' can be represented as 'A∩L'. The union set 248 can be based on a logical operator of 'AND'.

The union set 248 is a collection of the points of interest 204 occurring in at least one of the separate groupings of the points of interest 204. For example, the union set 248 can include a combination of the points of interest 204 by joining the categorical set 236 and the further set 238. The union set 248 between the grouping 'A' and the separate grouping 'L' can be represented as 'A∪L'. The union set 248 can be based on a logical operator of 'OR'.

The navigation system 100 can process a set count 250 corresponding to the categorical set 236, the further set 238, the intersection set 246, the union set 248, or a combination thereof. The set count 250 is a number of the points of interest 204 within a grouping or a set thereof.

For example, the set count 250 can include a categorical count 252, a further count 254, an intersection count 256, the union count 258, or a combination thereof. The categorical count 252 is the number of points of interest 204 within the categorical set 236. The categorical count 252 can be represented as 'K'.

Continuing with the example, the further count 254 is the number of points of interest 204 within the further set 238. The further count 254 can be represented as 'R'. The intersection count 256 is the number of points of interest 204 within the intersection set 246. The intersection count 256 can be represented as 'T'. The union count 258 is the number of points of interest 204 within the union set 248. The union count 258 can be represented as 'S'.

The navigation system 100 can further process an error-related probability 260, a corrective estimation 262, or a combination thereof. The error-related probability 260 is a measure or estimation of likelihood of an error associated with one or more instances of the points of interest 204. The error-related probability 260 can be based on a mathematical concept or branch of probability theory.

The error-related probability 260 can be associated with or for evaluating the target of interest 230. The error-related probability 260 can be for determining the erroneous entry 228. The error-related probability 260 can represent a possibility of an erroneous value for one or more instances of the field type 206 for one or more instances of the points of interest 204. The error-related probability 260 can further represent a possibility of an erroneous value given a specific condition.

The corrective estimation 262 is a likely correct or intended value or an entry corresponding to the erroneous entry 228. The corrective estimation 262 can be for replacing the erroneous entry 228. The corrective estimation 262 can include the value or the entry minimizing the error-related probability 260.

The navigation system 100 can determine the erroneous entry 228 based on the field selection 222 and the further selection 224 having the correlative categorical relationship 226. The navigation system 100 can select the target of interest 230 and determine one instance of the field type 206 or the value therein as the field selection 222 and another separate and related instance of the field type 206 or the value therein as the further selection 224.

The navigation system 100 can generate the categorical set 236 corresponding to the field selection 222, the further set 238 corresponding to the further selection 224, or a combination thereof. The navigation system 100 can further generate the intersection set 246, the union set 248, or a combination thereof based on the categorical set 236 and the further set 238.

The navigation system 100 can calculate the set count 250 associated with the categorical set 236, the further set 238, the intersection set 246, the union set 248, or a combination thereof. The navigation system 100 can further calculate the error-related probability 260 based on the categorical set 236, the further set 238, the intersection set 246, the union set 248, the set count 250 associated therewith, or a combination thereof.

The navigation system 100 can determine the erroneous entry 228 for the target of interest 230 based on the error-related probability 260. The navigation system 100 can further generate the corrective estimation 262 for replacing the erroneous entry 228. Details regarding the processing for the error-related probability 260 and the erroneous entry 228, the corrective estimation 262, or a combination thereof will be described below.

Figure 3:
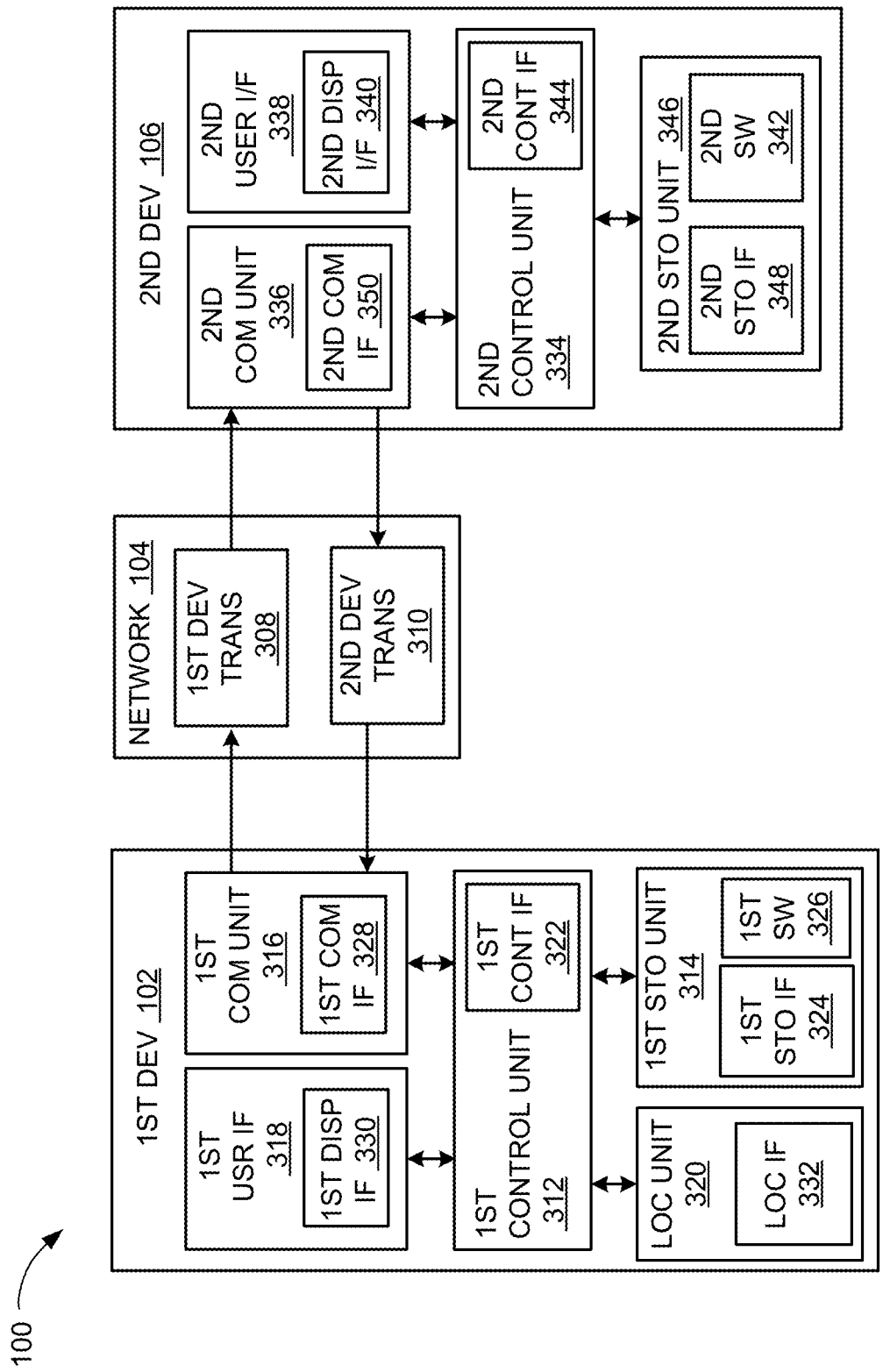
FIG. 3 is an exemplary block diagram of the navigation system.

Referring now to FIG. 3, therein is shown an exemplary block diagram of the navigation system 100. The navigation system 100 can include the first device 102, the network 104, and the second device 106. The first device 102 can send information in a first device transmission 308 over the network 104 to the second device 106. The second device 106 can send information in a second device transmission 310 over the network 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, and a first user interface 318, and a location unit 320. The first control unit 312 can include a first control interface 322. The first control unit 312 can execute a first software 326 to provide the intelligence of the navigation system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, data representing previously presented image, sound files, or a combination thereof.

The first storage unit 314 can be a volatile memory, a nonvolatile memory, an internal memory, an external memory, or a combination thereof. For example, the first storage unit 314 can be a nonvolatile storage such as nonvolatile random access memory (NVRAM), Flash memory, disk storage, or a volatile storage such as static random access memory (SRAM).

The first storage unit 314 can include a first storage interface 324. The first storage interface 324 can be used for communication between the first storage unit 314 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a desktop computer, and the network 104.

The first communication unit 316 can also function as a communication hub allowing the first device 102 to function as part of the network 104 and not limited to be an end point or terminal unit to the network 104. The first communication unit 316 can include active and passive components, such as microelectronics or an antenna, for interaction with the network 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include an output device, such as the display interface 202 of FIG. 2. The first display interface 330 can include a display, a projector, a video screen, a speaker, or any combination thereof.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the network 104 via the first communication unit 316.

The location unit 320 can generate location information, current heading, current acceleration, and current speed of the first device 102, as examples. The location unit 320 can be implemented in many ways. For example, the location unit 320 can function as at least a part of the global positioning system, an inertial navigation system, a cellular-tower location system, a pressure location system, or any combination thereof. Also, for example, the location unit 620 can utilize components such as an accelerometer or GPS receiver.

The location unit 320 can include a location interface 332. The location interface 332 can be used for communication between the location unit 320 and other functional units in the first device 102. The location interface 632 can also be used for communication external to the first device 102.

The location interface 332 can receive information from the other functional units or from external sources, or can transmit information to the other functional units or to external destinations. The external sources and the external destinations refer to sources and destinations external to the first device 102.

The location interface 332 can include different implementations depending on which functional units or external units are being interfaced with the location unit 320. The location interface 332 can be implemented with technologies and techniques similar to the implementation of the first control unit 312.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, a second user interface 338, and a second storage unit 346.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the network 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations external to the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the information such as data representing incoming images, data representing previously presented image, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between the second storage unit 346 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the network 104.

The second communication unit 336 can also function as a communication hub allowing the second device 106 to function as part of the network 104 and not limited to be an end point or terminal unit to the network 104. The second communication unit 336 can include active and passive components, such as microelectronics or an antenna, for interaction with the network 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the network 104 to send information to the second device 106 in the first device transmission 308. The second device 106 can receive information in the second communication unit 336 from the first device transmission 308 of the network 104.

The second communication unit 336 can couple with the network 104 to send information to the first device 102 in the second device transmission 310. The first device 102 can receive information in the first communication unit 316 from the second device transmission 310 of the network 104. The navigation system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the network 104.

The functional units in the second device 106 can work individually and independently of the other functional units. The second device 106 can work individually and independently from the first device 102 and the network 104.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the navigation system 100 is described by operation of the first device 102 and the second device 106. It is understood that the first device 102 and the second device 106 can operate any of the modules and functions of the navigation system 100.

Figure 4:
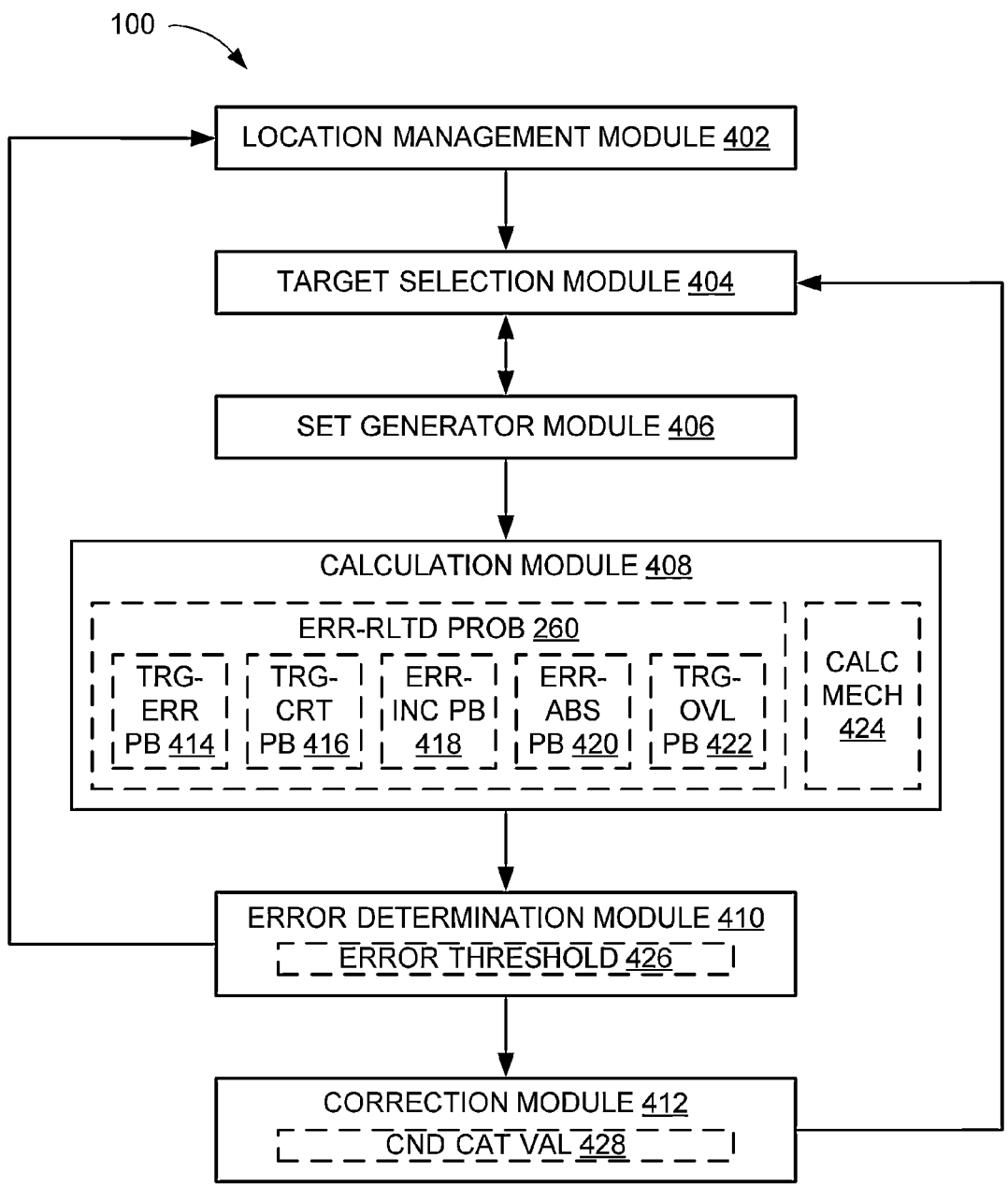
FIG. 4 is a control flow of the navigation system.

Referring now to FIG. 4, therein is shown a control flow of the navigation system 100. The navigation system 100 can include a location management module 402, a target selection module 404, a set generator module 406, a calculation module 408, an error determination module 410, a correction module 412, or a combination thereof.

The location management module 402 can be coupled to the target selection module 404, the error determination module 410, or a combination thereof using wired or wireless connections, by having an output of one module as an input of the other module, by having operations of one module influence operation of the other module, or a combination thereof. Similarly the target selection module 404 can be coupled to the set generator module 406, the correction module 412, or a combination thereof. Further, the set generator module 406 can be coupled to the calculation module 408, the calculation module 408 can be coupled to the error determination module 410, the error determination module 410 can be coupled to the correction module 412, or a combination thereof as described above.

The location management module 402 is for organizing, modifying, and accessing the interest point set 202 of FIG. 2. The location management module 402 can include or delete the points of interest 204 of FIG. 2 into or from the interest point set 202. The location management module 402 can arrange or sort the points of interest 204 in the interest point set 202. The location management module 402 can update or modify the field type 206 of FIG. 2 or values therein for one or more of the points of interest 204.

The location management module 402 can further access one or more of the points of interest 204. The location management module 402 can access the points of interest 204 stored in the first storage unit 314 of FIG. 3, the second storage unit 346 of FIG. 3, or a combination thereof. The location management module 402 can use the first control interface 322 of FIG. 3, the second control interface 344 of FIG. 3, the first storage interface 324 of FIG. 3, the second storage interface 342 of FIG. 3, or a combination thereof.

The location management module 402 can use the first control interface 322, the second control interface 344, the first storage interface 324, the second storage interface 342, or a combination thereof to read or write the data corresponding to the points of interest 204, the field type 206 therein, or a combination thereof. The location management module 402 can access the data for communicating the data to the user, such as by displaying the data, recreating sounds, further processing according to the data, or a combination thereof using the first device 102 of FIG. 1, the second device 106 of FIG. 1, or a combination thereof.

The location management module 402 can further communicate the accessed data between devices. The location management module 402 can use the first communication unit 316 of FIG. 3, the second communication unit 336 of FIG. 3, or a combination thereof to communicate the accessed data between devices.

The location management module 402 can further use the first control unit 312 of FIG. 3, the second control unit of FIG. 3, or a combination thereof to determine the correlative categorical relationship 226 of FIG. 2 between instances of the field type 206. The location management module 402 can determine the correlative categorical relationship 226 using a machine-learning mechanism, a pattern-recognition mechanism, a predetermined mechanism, or a combination thereof.

For example, the location management module 402 can generate and use classifiers, models, training sets, clusters, or a combination thereof using the various instances of the field type 206 across the interest point set 202. The location management module 402 can determine the correlative categorical relationship 226 based connections between instances of the field type 206 from the classifiers and the models generated from the interest point set 202.

Also for example, the location management module 402 can determine patterns of values, updates, changes, adjustments, or a combination thereof across instances of the field type 206. As a more specific example, the location management module 402 can determine the correlative categorical relationship 226 between the address 210 of FIG. 2 and the location coordinates 212 of FIG. 2 based on changes to both upon physical relocations of establishments.

For further example, the location management module 402 can determine the location management module 402 based on logical connections, rules, methods, or a combination thereof provided or predetermined by the navigation system 100. As a more specific example, the navigation system 100 can use the first user interface 318 of FIG. 3, the second user interface 338 of FIG. 3, or a combination thereof to receive input from the user regarding a connection between instances of the field type 206 or include a method to search and link the brand name 208 of FIG. 2 for locations, descriptions, rating, or a combination thereof. Also as a more specific example, the navigation system 100 can include a further categorization for instances of the field type 206, such as physical location for the address 210, the location coordinates 212, an area code of the contact information 214, or a combination thereof or such as a retail store or a whole seller for the brand name 208, the description, the rating, or a combination thereof.

After managing the points of interest 204, the control flow can pass from the location management module 402 to the target selection module 404. The control flow can pass by having the points of interest 204, the field type 206 therein, the correlative categorical relationship 226, or a combination thereof as an output from the location management module 402 to an input of the target selection module 404, storing the points of interest 204, the field type 206 therein, the correlative categorical relationship 226, or a combination thereof at a location known and accessible to the target selection module 404, by notifying the target selection module 404, such as by using a flag, an interrupt, a status signal, or a combination thereof, or a combination of processes thereof.

The target selection module 404 is for selecting an instance of the points of interest 204, the field type 206 therein, or a combination thereof for evaluation. The target selection module 404 can identify the target of interest 230 of FIG. 2 from the points of interest 204 in the interest point set 202. The target selection module 404 can identify the target of interest 230 by accessing one instance of the points of interest 204.

The target selection module 404 can identify the target of interest 230 based on a variety of factors. For example, the target selection module 404 can identify the target of interest 230 as an instance of the points of interest 204 based on an order or a method predetermined by the navigation system 100. As a more specific example, the target selection module 404 can identify the target of interest 230 based on the order for a routine maintenance or an error checking process for the navigation system 100.

Also for example, the target selection module 404 can identify the target of interest 230 based on an error report corresponding to an instance of the points of interest 204 received by the navigation system 100. The target selection module 404 can identify the instance of the points of interest 204 as the target of interest 230. For further example, the target selection module 404 can similarly identify the target of interest 230 based on receiving a selection or a designation from the user.

The target selection module 404 can further identify the field type 206 for processing or analysis based on the target of interest 230. The target selection module 404 can identify or select the field selection 222 of FIG. 2, the further selection 224 of FIG. 2, or a combination thereof. The target selection module 404 can identify or select the field selection 222, the further selection 224, or a combination thereof from the field type 206 of the target of interest 230.

The target selection module 404 can identify or select the field selection 222, the further selection 224, or a combination thereof similar to identification of the target of interest 230. For example, the target selection module 404 can identify or select the field selection 222 based on a predetermined order or method for the field type 206, an error report, a user selection, or a combination thereof as described above.

Also for example, the target selection module 404 can identify or select the field selection 222 as described above. The target selection module 404 can identify or select the further selection 224 as the field type 206 having the correlative categorical relationship 226 with the field type 206 selected as or identified as the field selection 222.

For illustrative purposes, the target selection module 404 is described as identifying the target of interest 230 and then the field type 206 therein. However, the target selection module 404 can identify the field selection 222, the further selection 224, or a combination thereof first, then identify or select the target of interest 230 having the field selection 222, the further selection 224, or a combination thereof therein.

The target selection module 404 can use the first control interface 332, the second control interface 344, the first storage interface 324, the second storage interface 348, or a combination thereof to access the points of interest 204. The target selection module 404 can use the first user interface 318, the second user interface 338, the first communication unit 316, the second communication unit 336, the first control unit 312, the second control unit 334, or a combination thereof to select the target of interest 230 from the points of interest 204. The target selection module 404 can similarly use the first user interface 318, the second user interface 338, the first communication unit 316, the second communication unit 336, the first control unit 312, the second control unit 334, or a combination thereof to select the field selection 222, the further selection 224, or a combination thereof for the target of interest 230.

After identifying the target of interest 230, the field selection 222, the further selection 224, or a combination thereof, the control flow can pass from the target selection module 404 to the set generator module 406. The control flow can pass similarly as described above between the location management module 402 and the target selection module 404, but using the target of interest 230, the field selection 222, the further selection 224, or a combination thereof.

The set generator module 406 is for generating various groupings of the points of interest 204 based on the target of interest 230, the field selection 222, the further selection 224, or a combination thereof. The set generator module 406 can generate the categorical set 236 of FIG. 2, the further set 238 of FIG. 2, the intersection set 246 of FIG. 2, the union set 248 of FIG. 2, or a combination thereof based on the target of interest 230, the field selection 222, the further selection 224, the correlative categorical relationship 226, or a combination thereof.

The set generator module 406 can generate the categorical set 236 and the further set 238 based on the field selection 222, the further selection 224, the target of interest 230, or a combination thereof. The set generator module 406 can generate the categorical set 236 as the instances of the points of interest 204 having the field selection 222 of the target of interest 230.

For example, the location management module 402 can determine the correlative categorical relationship 226 between the address 210 and the location coordinates 212 as described above. The target selection module 404 can identify the target of interest 230 represented as 'M', with the field selection 222 as the address 210 and the further selection as the location coordinates 212.

Continuing with the example, the set generator module 406 can generate the categorical set 236 as the address set 240 of FIG. 2. The set generator module 406 can generate the categorical set 236 as the address set 240 including the points of interest 204 including same or similar values for the address 210 as the target of interest 230. The address set 240 can be represented as $A_M = \{A^1, A^2, A^3, \ldots A^K\}$ including the points of interest the street label 216 of FIG. 2, the city label 218 of FIG. 2, the state label 220 of FIG. 2, or a combination thereof of the target of interest 230 M.

The set generator module 406 can generate the further set 238 as the instances of the points of interest 204 having the further selection 224 of the target of interest 230 or satisfying a condition associated with the further selection 224. Continuing with the example, the set generator module 406 can generate the further set 238 as the area set 242 of FIG. 2. The set generator module 406 can generate the further set 238 as the area set 242 based on the location coordinates 212, the area size 244 of FIG. 2, or a combination thereof.

As a more specific example, the set generator module 406 can generate the area set 242 including the points of interest 204 having the location coordinates 212 within the area size 244 of the location coordinates 212 for the target of interest 230 M. The area set 242 can be represented as $L_M = \{L^1, L^2, L^3, \ldots L^R\}$.

The set generator module 406 can generate the categorical set 236 and the further set 238 based on the correlative categorical relationship 226 between the field selection 222 and the further selection 224. The set generator module 406 can generate the categorical set 236 corresponding to the field selection 222, the further set 238 corresponding to the further selection 224, or a combination thereof as described above, with the field selection 222 and the further selection 224 connected by the correlative categorical relationship 226.

The set generator module 406 can further determine the set count 250 of FIG. 2 for the categorical set 236, the further set 238, or a combination thereof. For example, the set generator module 406 can determine the categorical count 252 of FIG. 2, shown as 'K', for representing a quantity of the points of interest 204 in the categorical set 236. Also for example, the set generator module 406 can determine the further count 254 of FIG. 2, shown as 'R', for representing a quantity of the points of interest 204 in the further set 238.

The set generator module 406 can include a minimum size threshold for the set count 250. For example, the set generator module 406 can include the minimum size of three or more for the categorical set 236, the further set 238, or a combination thereof. The set generator module 406 can determine the sets to be insufficient when the categorical count 252, the further count 254, or a combination thereof is or are less than the minimum size threshold.

The set generator module 406 can pass the control flow back to the target selection module 404 for selecting a different instance of the target of interest 230 or a different instance of the field type 206 when the categorical count 252, the further count 254, or a combination thereof is or are less than the minimum size threshold. The control flow can pass similarly as described above between the location management module 402 and the target selection module 404.

The set generator module 406 can further generate the intersection set 246 and the union set 248 based on the categorical set 236 and the further set 238. The set generator module 406 can generate the intersection set 246 and the union set 248 based on the categorical set 236 and the further set 238 based on the categorical count 252, the further count 254, or a combination thereof meeting or exceeding the minimum size threshold.

The set generator module 406 can generate the intersection set 246 as an intersection of the categorical set 236 and the further set 238. The set generator module 406 can generate the intersection set 246 including the points of interest 204 occurring or existing in both the categorical set 236 and the further set 238.

Continuing with the example, the set generator module 406 can generate the intersection set 246 including the points of interest 204 existing in both the address set 240 and the area set 242. The intersection set 246 can be represented as $O_M = A_M \cap L_M$. The set generator module 406 can determine the set count 250 of the intersection set 246 as the intersection count 256 of FIG. 2, represented as 'T', similarly as described above.

The set generator module 406 can generate the union set 248 as a union of the categorical set 236 and the further set 238. The set generator module 406 can generate the union set 248 including the points of interest 204 occurring or existing in either the categorical set 236 or the further set 238, or by combining the categorical set 236 and the further set 238.

Continuing with the example, the set generator module 406 can generate the union set 248 including the points of interest 204 existing in either the address set 240 or the area set 242. The union set 248 can be represented as $U_M = A_M \cup L_M$. The set generator module 406 can determine the set count 250 of the union set 248 as the union count 258 of FIG. 2, represented as 'S', similarly as described above.

The set generator module 406 can use the first control interface 332, the second control interface 344, the first storage interface 324, the second storage interface 348, or a combination thereof to access the points of interest 204. The set generator module 406 can use the first control unit 312, the second control unit 334, or a combination thereof to evaluate the points of interest and generate the categorical set 236, the further set 238, the intersection set 246, the union set 248, or a combination thereof.

The set generator module 406 can further use the first control unit 312, the second control unit 334, or a combination thereof to determine the set count 250, such as the categorical count 252, the further count 254, the intersection count 256, the union count 258, or a combination thereof. The set generator module 406 can store the categorical set 236, the further set 238, the intersection set 246, the union set 248, the categorical count 252, the further count 254, the intersection count 256, the union count 258, or a combination thereof in the first storage unit 314, the second storage unit 346, or a combination thereof.

After determining the various groupings satisfying the minimum size threshold, the control flow can pass from the set generator module 406 to the calculation module 408. The control flow can pass similarly as described above between the location management module 402 and the target selection module 404.

The calculation module 408 is for calculating the error-related probability 260 of FIG. 2. The calculation module 408 can calculate the error-related probability 260 based on the categorical set 236, the further set 238, the intersection set 246, the union set 248, or a combination thereof, the set count 250 associated therewith, such as the categorical count 252, the further count 254, the intersection count 256, the union count 258, or a combination thereof.

The calculation module 408 can calculate the error-related probability 260 include a target-error probability 414, a target-correct probability 416 an error-inclusion probability 418, an error-absent probability 420, a target-overall probability 422, or a combination thereof. The target-error probability 414 can represent a probability of the target of interest 230 given error exists in the field type 206.

The target-error probability 414 can be calculated based on or given the target of interest 230. The target-error probability 414 can be represented as P(M|Err=true) with 'M' representing the condition and 'Err' representing error in the field type 206, such as the field selection 222, the further selection 224, or a combination thereof.

The target-correct probability 416 can represent a probability of the target of interest 230 given error is absent in the field selection 222, the further selection 224, or a combination thereof. The target-correct probability 416 can be calculated based on or given the target of interest 230. The target-correct probability 416 can be represented as P(M|Err=false).

The error-inclusion probability 418 can represent a probability of error existing in the field type 206, including the field selection 222, the further selection 224, or a combination thereof. The error-inclusion probability 418 can be calculated independent of the target of interest 230. The error-inclusion probability 418 can be represented as P(Err=true). The error-absent probability 420 can represent a probability of error being absent in the field type 206. The error-absent probability 420 can be calculated independent of the target of interest 230. The error-absent probability 420 can be represented as P(Err=false).

The target-overall probability 422 can represent a combination or a derivation based on the target-error probability 414, the target-correct probability 416, the error-inclusion probability 418, the error-absent probability 420, or a combination thereof. The target-overall probability 422 can represent a probability that the error exists in the field type 206 given the target of interest 230. The target-overall probability 422 can be represented as P(Err=true|M).

The calculation module 408 can calculate the error-related probability 260 by calculating the target-error probability 414, the target-correct probability 416, the error-inclusion probability 418, the error-absent probability 420, or a combination thereof. The calculation module 408 can calculate the error-related probability 260 based on a calculation mechanism 424.

The calculation mechanism 424 is a method or a process for manipulating and assigning values to calculate the error-related probability 260. The calculation mechanism 424 can include an equation, a sequence of steps, a hardware calculation circuitry, or a combination thereof. The calculation mechanism 424 can include the Bayes' mechanism. The calculation mechanism 424 can be based on the target of interest 230, the target neighbor 234 of FIG. 2, the categorical set 236, the further set 238, the intersection set 246, the union set 248, the set count 250 associated therewith, or a combination thereof.

For example, the calculation module 408 can use the calculation mechanism 424 for the address set 240 and the area set 242 and corresponding instance of the geocoding error 232 of FIG. 2. The calculation module 408 can calculate the target-error probability 414 according to the calculation mechanism 424 represented as:

$$P(M \mid Err = \text{true}) = \begin{cases} \dfrac{(S-R)}{S} & \text{if } M \in \{U_M - L_M\} \\ \dfrac{T}{R} & \text{if } M \notin \{U_M - L_M\} \end{cases} \quad \text{Equation (1)}$$

The calculation module 408 can calculate the target-error probability 414 according to the calculation mechanism 424 based on the union set 248, shown as '$U_M$', and the further set 238, shown as '$L_M$' for the area set 242. As a more specific example, the calculation module 408 can calculate the target-error probability 414 based on a different between the union set 248 and the further set 238 in comparison to the target of interest 230.

Also as a more specific example, the calculation module 408 can calculate the target-error probability 414 based on the union count 258, the further count 254, the intersection count 256, or a combination thereof. For the target of interest 230 corresponding to the erroneous entry 228 for the geocoding error 232, the ratio of number of points of interest having the location coordinates 212 outside of the intersection set 246 to the total number of the points of interest in the union set 248 gives the probability of error.

Continuing with the example, the calculation module 408 can calculate the target-correct probability 416 according to the calculation mechanism 424 represented as:

$$P(M \mid Err = \text{false}) = \begin{cases} \dfrac{T}{R} & \text{if } M \in O_M \\ \dfrac{(S-R)}{S} & \text{if } M \notin O_M \end{cases} \quad \text{Equation (2)}$$

The calculation module 408 can calculate the target-correct probability 416 based on the intersection set 246, shown as '$O_M$'. As a more specific example, the calculation module 408 can calculate the target-correct probability 416 based on the intersection set 246 in comparison to the target of interest 230.

Also as a more specific example, the calculation module 408 can calculate the target-correct probability 416 based on the union count 258, the further count 254, the intersection count 256, or a combination thereof. For correctly geocoded instance of the target of interest 230, the ratio of number of the points of interest 204 having the location coordinates 212 intersecting with the points of interest 204 having the same instance of the address 210 or same portions therein to the number of points of interest 204 within the area size 244 of the target of interest 230 gives the probability of correct geocoding.

Continuing with the example, the calculation module 408 can calculate the error-inclusion probability 418 according to the calculation mechanism 424 represented as:

$$P(Err = \text{true}) = \frac{1}{N} \sum_{Unique\ Addrresses} (S - R). \quad \text{Equation (3)}$$

The error-inclusion probability 418 can represent the probability of bad geocoding.

Continuing with the example, the calculation module 408 can calculate the error-absent probability 420 according to the calculation mechanism 424 represented as:

$$P(\text{Err}=\text{fals})=1-P(\text{Err}=\text{true}). \quad \text{Equation (4)}$$

The error-absent probability 420 can represent a prior probability of geocoding.

The calculation module 408 can calculate the target-overall probability 422 based on the error-absent probability 420, the error-inclusion probability 418, the target-error probability 414, the target-correct probability 416, or a combination thereof. Continuing with the example, the calculation module 408 can calculate the target-overall probability 422 according to the calculation mechanism 424 represented as:

$$P(Err = \text{true} \mid M) = \frac{P(M \mid Err = \text{true}) \cdot P(Err = \text{true})}{P(M \mid Err = \text{true}) \cdot P(Err = \text{true}) + P(M \mid Err = \text{false}) \cdot P(Err = \text{false})}. \quad \text{Equation (5)}$$

Continuing with the example, the target-overall probability 422 can represent a probability of bad geo-coding given the target of interest 230, shown as '1\4'. The target-overall probability 422 can be based on the Bayes' mechanism as represented in the calculation mechanism 424. The target-overall probability 422 can further represent the probability of the target of interest 230 being erroneous based on the statistics of the points of interest 204 qualifying as the target neighbor 234, such as based on physical proximity as represented by the correlative categorical relationship 226 for the geocoding error 232.

For illustrative purposes, the calculation mechanism 424 for the error-related probability 260 has been shown in Equations (1)-(5). However it is understood that the calculation mechanism 8 can include other algebraic expression composing of statistics regarding the points of interest, as long as the calculation mechanism 424 obeys the probability laws.

The calculation module 408 can use the first control unit 312, the second control unit 334, or a combination thereof to calculate the error-related probability 260. The calculation module 408 can store the error-related probability 260 in the first storage unit 314, the second storage unit 346, or a combination thereof.

After calculating the error-related probability 260, the control flow can pass from the calculation module 408 to the error determination module 410. The control flow can pass similarly as described above between the location management module 402 and the target selection module 404 but using the error-related probability 260.

The error determination module 410 is for determining the erroneous entry 228 associated with the target of interest 230. The error determination module 410 can determine the erroneous entry 228 based on the error-related probability 260.

The error determination module 410 can determine the erroneous entry 228 based on comparing the error-related probability 260 to an error threshold 426 predetermined by the navigation system 100. For example, the error determination module 410 can determine the field selection 222, the further selection 224, or a combination thereof for the target of interest 230 as the erroneous entry 228 when the error-related probability 260, such as the target-error probability 414, the target-correct probability 416, the error-inclusion probability 418, the error-absent probability 420, the target-overall probability 422, or a combination thereof in comparison to the error threshold 426 indicates the erroneous entry 228.

The error determination module 410 can determine the erroneous entry 228 when the error-related probability 260 exceeds the error threshold 426, does not exceed the error threshold 426, is within a range described by the error threshold 426, or is outside the range. For example, the error determination module 410 can determine the erroneous entry 228 when the target-overall probability 422 representing a probability of error for the target of interest 230 exceeds the error threshold 426.

The error determination module 410 can use the first control unit 312, the second control unit 334, or a combination thereof to determine the erroneous entry 228. The error determination module 410 can use the first user interface 318, the second user interface 338, the first communication unit 316, the second communication unit 336, or a combination thereof to communicate the erroneous entry 228. The error determination module 410 can store the erroneous entry 228 in the first storage unit 314, the second storage unit 346, or a combination thereof.

The error determination module 410 can further determine the erroneous entry 228 by comparing the error-related probability 260 of the target of interest 230 to the error-related probability 260 corresponding to a complementary instance of the points of interest 204. The error determination module 410 can determine the erroneous entry 228 when a difference between the error-related probability 260 corresponding to the target of interest 230 and the complementary instance of the points of interest 204 exceeds the error threshold 426.

Based on comparing the error-related probability 260 to the error threshold 426, the control flow can pass from the error determination module 410 to the location management module 402, the correction module 412, or a combination thereof. The control flow can pass similarly as described above between the location management module 402 and the target selection module 404. For example, the control flow can pass to the correction module 412 when the erroneous entry 228 is determined to exist for the target of interest 230.

Also for example, the control flow can pass to the location management module 402 when the erroneous entry 228 is not determined to exist for the target of interest 230. The location management module 402 can record that the target of interest 230 or the field selection 222 therein does not include the erroneous entry 228. The navigation system 100 can end the process for the target of interest 230 or the field type 206, select a different instance of the points of interest 204 as the target of interest 230 or a different instance of the field type 206 as the field selection 222 and repeat the above described process, such as for a system-wide maintenance or error detection routine.

The correction module 412 is for accurately modifying the erroneous entry 228. The correction module 412 can generate the corrective estimation 262 of FIG. 2 for replacing the erroneous entry 228.

The correction module 412 can generate the corrective estimation 262 using the first control unit 312, the second control unit 334, or a combination thereof. The correction module 412 can store the corrective estimation 262 in the first storage unit 314, the second storage unit 346, or a combination thereof.

The correction module 412 can generate the corrective estimation 262 in a variety of ways. For example, the correction module 412 can generate the corrective estimation 262 as a mean of all values for the field selection 222 or the further selection 224 across the categorical set 236, the further set 238, the intersection set 246, the union set 248, or a combination thereof. Also for example, the correction module 412 can generate the corrective estimation 262 as a most frequently occurring value for the field selection 222 or the further selection 224 across the categorical set 236, the further set 238, the intersection set 246, the union set 248, or a combination thereof.

For further example, the correction module 412 can generate the corrective estimation 262 using a candidate category value 428 representing a temporary value for the field selection 222 or the further selection 224 for optimizing the error-related probability 260 over the erroneous entry 228. The correction module 412 can select the candidate category value 428 based on the categorical set 236, the further set 238, the intersection set 246, the union set 248, or a combination thereof.

As a more specific example, the correction module 412 can select the candidate category value 428 as a value for the field selection 222, the further selection 224, or a combination thereof for an instance of the points of interest 204 included in the categorical set 236, the further set 238, the intersection set 246, the union set 248, or a combination thereof. Also as a more specific example, the correction module 412 can select the candidate category value 428 based on a mean or a frequency of a value for the field selection 222, the further selection 224, or a combination thereof for an instance of the points of interest 204 included in the categorical set 236, the further set 238, the intersection set 246, the union set 248, or a combination thereof as exemplified above.

Continuing with the example, the navigation system 100 can repeat the above described process using the candidate category value 428 instead of the previously used and determined instance of the erroneous entry 228 for the field selection 222, the further selection 224, or a combination thereof. As a more specific example, the set generator module 406 can use the candidate category value 428 for the target of interest 230 and generate the various sets.

Continuing with the more specific example, the calculation module 408 can calculate the error-related probability 260 corresponding to the target of interest 230 including the candidate category value 428 instead of the erroneous entry 228. The error determination module 410 can generate the corrective estimation 262 as the candidate category value 428 optimizing the error-related probability 260 for replacing the erroneous entry 228.

It has been discovered that the field selection 222 and the further selection 224 for the field type 206 based on the correlative categorical relationship 226 provides a logical hypothesis for systematically determining the erroneous entry 228. The correlative categorical relationship 226 can describe the logical relationship implicated by the field selection 222 and the further selection 224, which can be used to cross-check the different data fields for logical consistency in determining the erroneous entry 228.

It has further been discovered that the categorical set 236, the further set 238, including derivations thereof, such as the intersection set 246 or the union set 248, and including the set count 250 thereof provides a method of representing the points of interest 204 having the logical connection for systematically determining the erroneous entry 228. The various sets and corresponding instances of the set count 250 can provide a boundary or a training set for testing the logical consistency for the points of interest 204 for processing for the erroneous entry 228.

It has further been discovered that the address set 240 and the area set 242 provides a method for systematically determining the geocoding error 232. The address set 240 and the area set 242 can be used to determine a logical consistency for the points of interest 204 based on geographical proximity and overlaps in the data for determining the geocoding error 232.

It has further been discovered that the error-related probability 260 provides a method of quantifying and analyzing the field type 206 for systematically determining the erroneous entry 228. The error-related probability 260 can accurately quantify the logical consistencies or inconsistencies in the points of interest 204 or the data thereof for determining the erroneous entry 228.

It has further been discovered that the corrective estimation 262 provides a systematic correction for the erroneous entry 228. The corrective estimation 262 can accurately estimate or predict the data intended for the field type 206 instead of the erroneous entry 228 through the process described above.

As a more comprehensive example, the location management module 402 can manage the interest point set 202 having the points of interest 204 representing multiple businesses at a common site or building. The points of interest 204 at the common site or building can have the address 210 of "1 Broadway, New York, N.Y.".

Continuing with the example, the points of interest 204 can include one point of interest (POI) with the brand name 208 of "A Video" and another POI with the brand name of "U TV Network". Both "A Video" and "U TV Network" can include the location coordinates 212 of (40.757494, −73.985905). The points of interest 204 can further include 16 POI including the location coordinates 212 of (40.704700, −74.014122). The 16 instances of the POI can each have unique instances of the brand name 208.

Continuing with the example, the target selection module 404 can select the address 210 and the location coordinates 212 as the field selection 222 and the further selection 224. The target selection module 404 can select the target of interest 230 as the "A Video". The area size 244 can be based on a distance between the two different instances of the location coordinates 212 representing approximately four miles. The set generator module 406 can generate the various groupings or sets as described above for the location coordinates 212 and the address 210.

Continuing with the example, the calculation module 408 can calculate the target-error probability 414, represented as P("A Video"|Err=true), using the calculation mechanism 424 described by Equation (1) as 14/18 or 0.7777. The target-correct probability 416, represented as P("A Video"|Err=false), can be calculated using the calculation mechanism 424 described by Equation (2) as 2/18 or 0.1111. The error-inclusion probability 418, represented as P(Err=true) can be assumed as 0.1 for 10% of the POIs having error in the address 210 or the location coordinates 212.

Continuing with the example, the calculation module 408 can calculate the target-overall probability 422, represented as P(Err=true|"A Video"), using the calculation mechanism 424 described by Equation (5) as 0.4575. The navigation system 100 can further identify the target of interest 230 as "U TV Network" and calculate the corresponding instance of the target-overall probability 422 also as 0.4575.

Continuing with the example, the navigation system 100 can calculate the target-overall probability 422 for the 16 POIs as 0.015. The error determination module 410 can determine the erroneous entry 228 for the location coordinates 212 of "A Video" or "U TV Network" based on the 45.75% chance of error indicated by the error-related probability 260 or a difference between the 45.75% result for the target of interest 230 and a 1.5% chance result of the error-related probability 260 corresponding to the complementary 16 instances of the POIs.

For illustrative purposes, the navigation system 100 is described as determining the erroneous entry 228 and generating the corrective estimation 262 based on the correlative categorical relationship 226 between the address 210 and the location coordinates 212. However, it is understood that the navigation system 100 can determine the erroneous entry 228 and generate the corrective estimation 262 based types of the correlative categorical relationship 226 such as distributor and retail locations, the contact information 214 and the address 210, the brand name 208 and other instances of the field type 206, or a combination thereof.

For further illustrative purposes, the navigation system 100 is described as determining the erroneous entry 228 and generating the corrective estimation 262 based on overlaps in the location of the points of interest 204 using the address 210 and the location coordinates 212 thereof. However, it is understood that the navigation system 100 can determine the erroneous entry 228 and generate the corrective estimation 262 based on other types of domain knowledge represented by the correlative categorical relationship 226 as exemplified above.

The modules described in this application can be hardware implementation or hardware accelerators, including passive circuitry, active circuitry, or both, in the first storage unit 314, the second storage unit 346, the first control unit 316, the second control unit 338, or a combination thereof. The modules can also be hardware implementation or hardware accelerators, including passive circuitry, active circuitry, or both, within the first device 102 or the second device 106, but outside of the first storage unit 314, the second storage unit 346, the first control unit 316, the second control unit 338, or a combination thereof.

The navigation system 100 has been described with module functions or order as an example. The navigation system 100 can partition the modules differently or order the modules differently. For example, the functions of the location management module 402 and the target selection module 404 can be combined. Also for example, the calculation module 408 can include sub-modules for calculating different instances of the error-related probability 260 or for processing the complementary instances of the points of interest 204. Also for example, the navigation system 100 can include a separate module following the correction module 412 for processing the candidate category value 428 similarly as the erroneous entry 228.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be stored in the non-transitory computer readable medium. The first storage unit 314, the second storage unit 346, or a combination thereof can represent the non-transitory computer readable medium. The first storage unit 314, the second storage unit 346, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The physical transformation from the erroneous entry 228 and the corresponding error-related probability 260 results in the movement in the physical world, such as content displayed or recreated for the user on the first device 102. The content, such as navigation information or voice signal of a caller, reproduced on the first device 102 can influence the user's movement, such as following the navigation information or replying back to the caller. Movement in the physical world results in changes to data regarding access to the points of interest 204, which can be fed back into the navigation system 100 and influence the various groupings or sets for the points of interest 204 and further influence the error-related probability 260.

Figure 5:
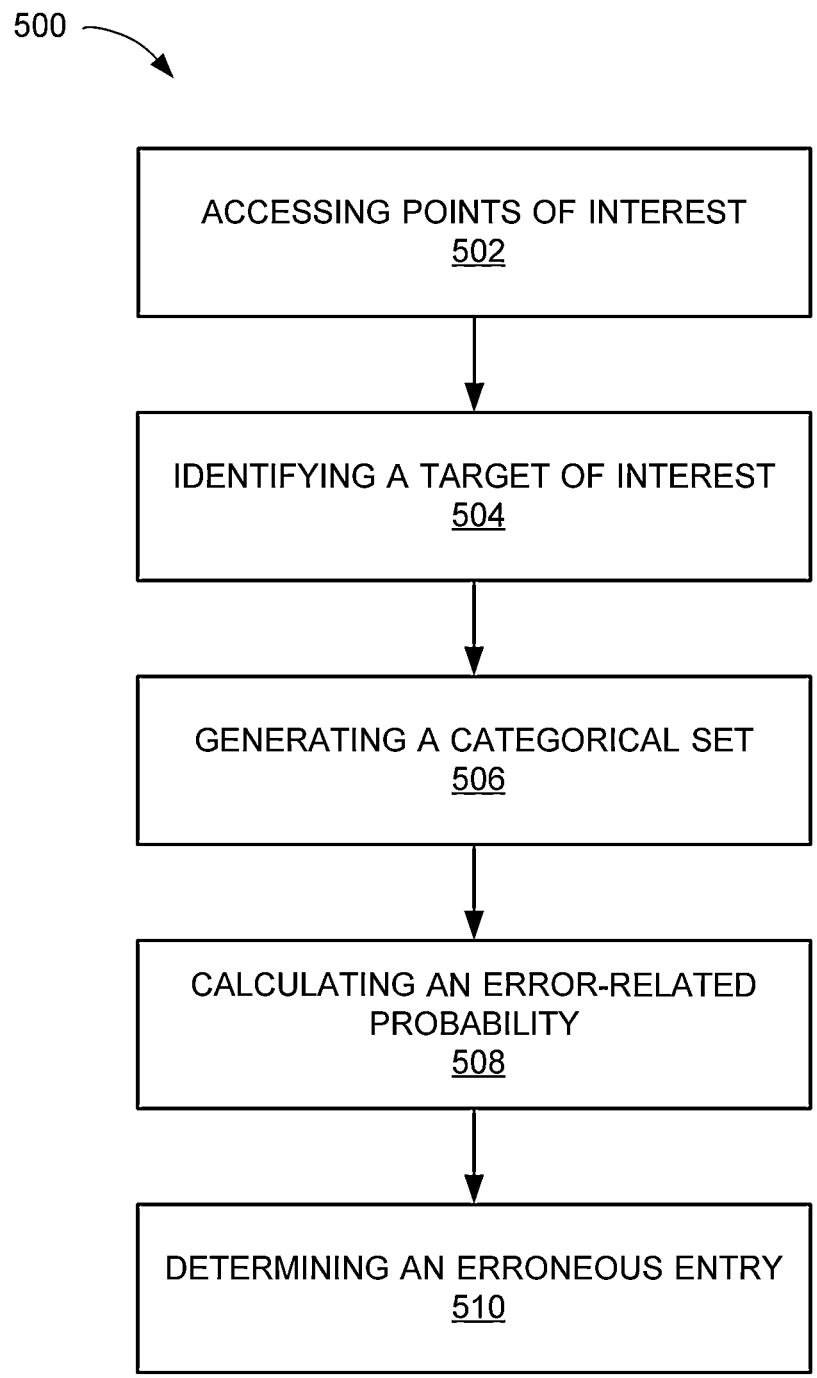
FIG. 5 is a flow chart of a method of operation of a navigation system in an embodiment of the present invention.

Referring now to FIG. 5, therein is shown a flow chart of a method 500 of operation of a navigation system 100 in an embodiment of the present invention. The method 500 includes: accessing points of interest in a block 502; identifying a target of interest including a field selection based on accessing the points of interest in a block 504; generating a categorical set and a further set from the points of interest based on the field selection of the target of interest in a block 506; calculating an error-related probability based on the categorical set and the further set in a block 508; and determining an erroneous entry associated with the target of interest based on the error-related probability for displaying on a device in a block 510.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a navigation system comprising:
   accessing points of interest;
   identifying a target of interest including a field selection based on accessing the points of interest;
   generating a categorical set and a further set from the points of interest based on the field selection of the target of interest;
   calculating an error-related probability based on the categorical set and the further set; and
   determining an erroneous entry associated with the target of interest based on the error-related probability for displaying on a device.

2. The method as claimed in claim 1 wherein generating the categorical set and the further set includes generating the categorical set and the categorical set based on a correlative categorical relationship associated with the field selection.

3. The method as claimed in claim 1 further comprising:
   generating an intersection set and a union set based on the categorical set and the further set; and wherein:
   calculating the error-related probability includes calculating the error-related probability based on the intersection set and the union set.

4. The method as claimed in claim 1 wherein calculating the error-related probability includes:
   calculating an error-absent probability, an error-inclusion probability, a target-error probability, and a target-correct probability; and
   calculating a target-overall probability based on the error-absent probability, the error-inclusion probability, the target-error probability, and the target-correct probability.

5. The method as claimed in claim 1 further comprising generating a corrective estimation for replacing the erroneous entry.

6. The method as claimed in claim 1 wherein:
   identifying the target of interest includes identifying the target of interest including the field selection and the further selection based on accessing the points of interest; and
   generating the categorical set and the further set includes generating the categorical set and the further set from the points of interest based on the field selection and the further selection, the categorical set and the further set each including at least three instances of the points of interest.

7. The method as claimed in claim 6 wherein generating the categorical set and the further set includes generating the categorical set and the further set based on a correlative categorical relationship between the field selection and the further selection with the categorical set corresponding to the field selection and the further set corresponding to the further selection.

8. The method as claimed in claim 6 further comprising:
   generating an intersection set including one or more instances of the points of interest occurring in both the categorical set and the further set;
   generating a union set based on combining the categorical set and the further set; and
   wherein:
   calculating the error-related probability includes calculating the error-related probability based on a set count associated with the categorical set, the further set, the intersection set, the union set, or a combination thereof.

9. The method as claimed in claim 6 wherein calculating the error-related probability includes:
   calculating an error-absent probability and an error-inclusion probability independent of the target of interest;
   calculating a target-error probability and a target-correct probability given the target of interest; and
   calculating a target-overall probability according to a calculation mechanism based on the error-absent probability, the error-inclusion probability, the target-error probability, and the target-correct probability.

10. The method as claimed in claim 6 further comprising:
    selecting a candidate category value based on the categorical set, the further set, or a combination thereof;
    calculating the error-related probability corresponding to the target of interest including the candidate category value instead of the erroneous entry; and
    generating a corrective estimation for replacing the erroneous entry.

11. A navigation system comprising:
a storage interface for accessing points of interest;
a control unit, coupled to the storage interface, configured to:
- identify a target of interest including a field selection based on accessing the points of interest,
- generate a categorical set and a further set from the points of interest based on the field selection of the target of interest,
- calculate an error-related probability based on the categorical set and the further set, and
- determine an erroneous entry associated with the target of interest based on the error-related probability for displaying on a device.

12. The system as claimed in claim 11 wherein the control unit is configured to generate the categorical set and the categorical set based on a correlative categorical relationship associated with the field selection.

13. The system as claimed in claim 11 wherein the control unit is configured to:
- generate an intersection set and a union set based on the categorical set and the further set; and
- calculate the error-related probability based on the intersection set and the union set.

14. The system as claimed in claim 11 wherein the control unit is configured to:
- calculate an error-absent probability, an error-inclusion probability, a target-error probability, and a target-correct probability; and
- calculate a target-overall probability based on the error-absent probability, the error-inclusion probability, the target-error probability, and the target-correct probability.

15. The system as claimed in claim 11 wherein the control unit is configured to generate a corrective estimation for replacing the erroneous entry.

16. A non-transitory computer readable medium including instructions for a navigation system comprising:
- accessing points of interest;
- identifying a target of interest including a field selection based on accessing the points of interest;
- generating a categorical set and a further set from the points of interest based on the field selection of the target of interest;
- calculating an error-related probability based on the categorical set and the further set; and
- determining an erroneous entry associated with the target of interest based on the error-related probability for displaying on a device.

17. The non-transitory computer readable medium as claimed in claim 16 wherein generating the categorical set and the further set includes generating the categorical set and the categorical set based on a correlative categorical relationship associated with the field selection.

18. The non-transitory computer readable medium as claimed in claim 16 further comprising:
- generating an intersection set and a union set based on the categorical set and the further set; and
wherein:
- calculating the error-related probability includes calculating the error-related probability based on the intersection set and the union set.

19. The non-transitory computer readable medium as claimed in claim 16
wherein calculating the error-related probability includes:
- calculating an error-absent probability, an error-inclusion probability, a target-error probability, and a target-correct probability; and
- calculating a target-overall probability based on the error-absent probability, the error-inclusion probability, the target-error probability, and the target-correct probability.

20. The non-transitory computer readable medium as claimed in claim 16 further comprising generating a corrective estimation for replacing the erroneous entry.

* * * * *